Jan. 11, 1938. A. OBERHOFFKEN 2,104,756
METAL REMOVING MACHINE
Filed June 2, 1934 4 Sheets-Sheet 3
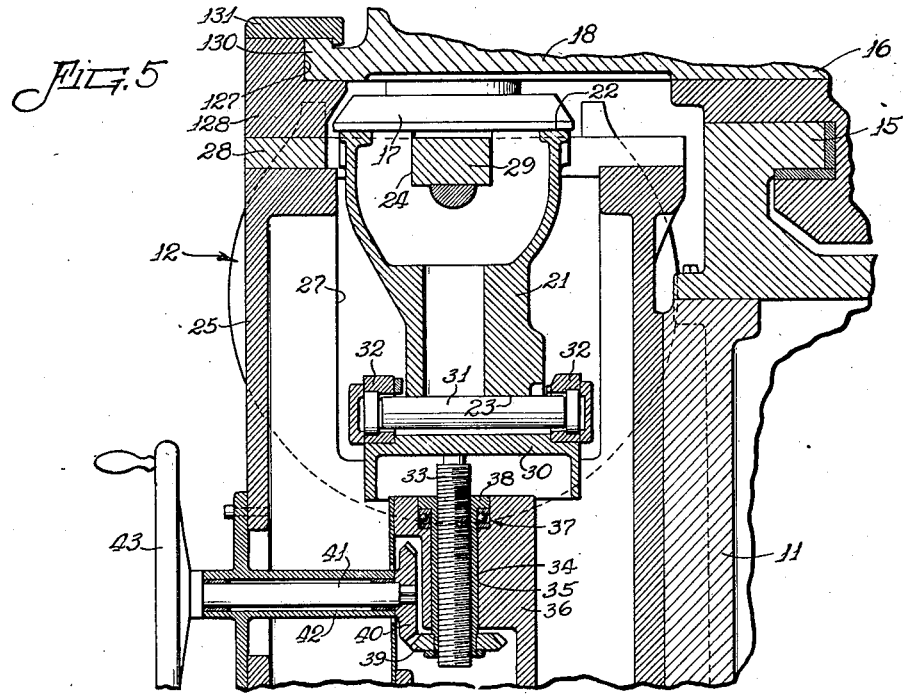
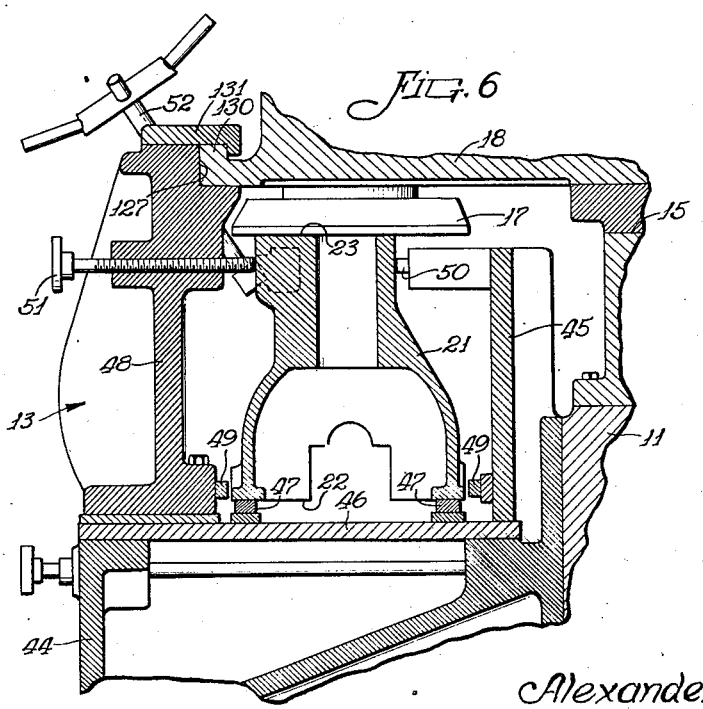
INVENTOR
Alexander Oberhoffken
By Chindahl, Parker & Carlson
ATTORNEYS

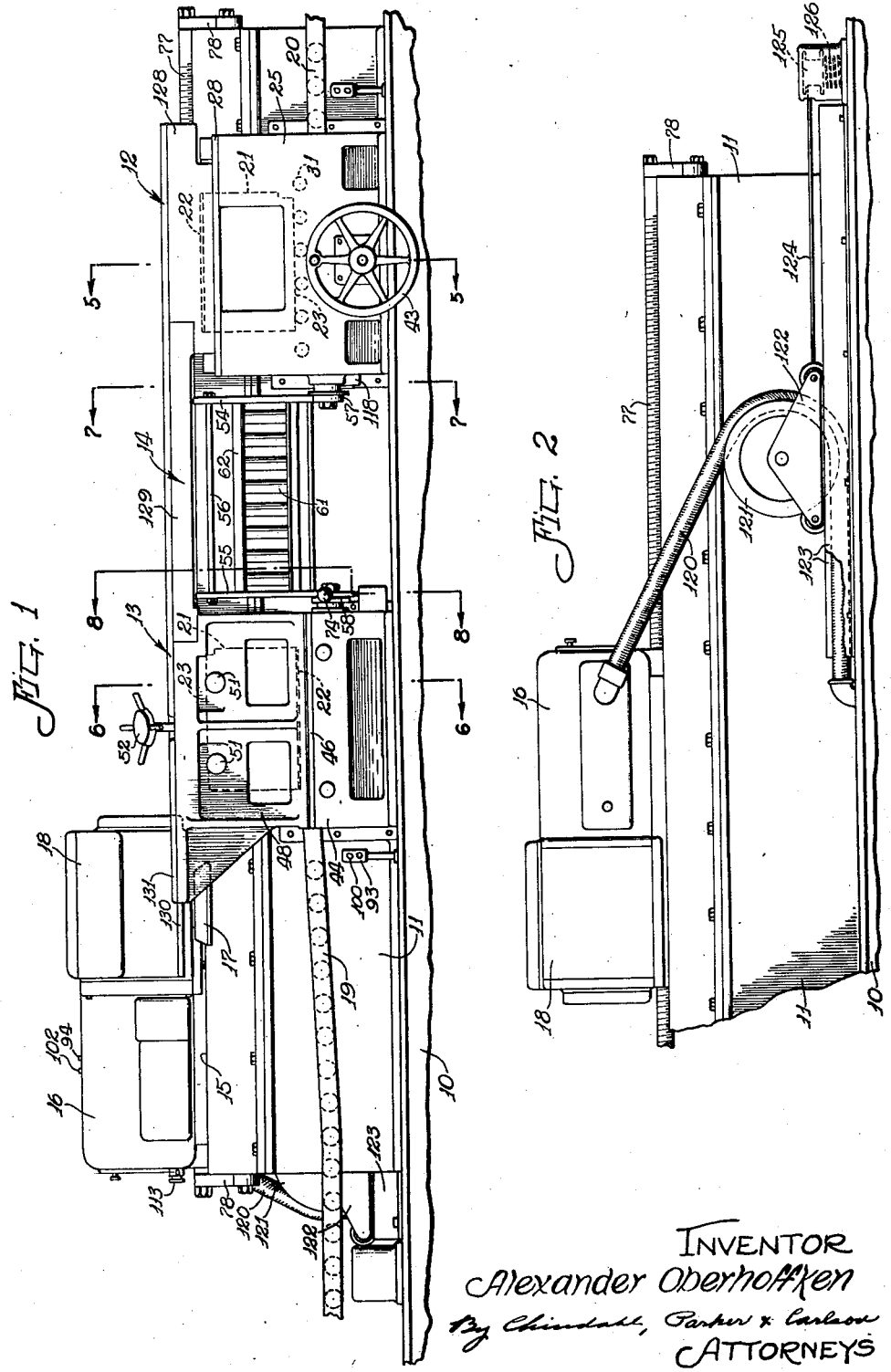

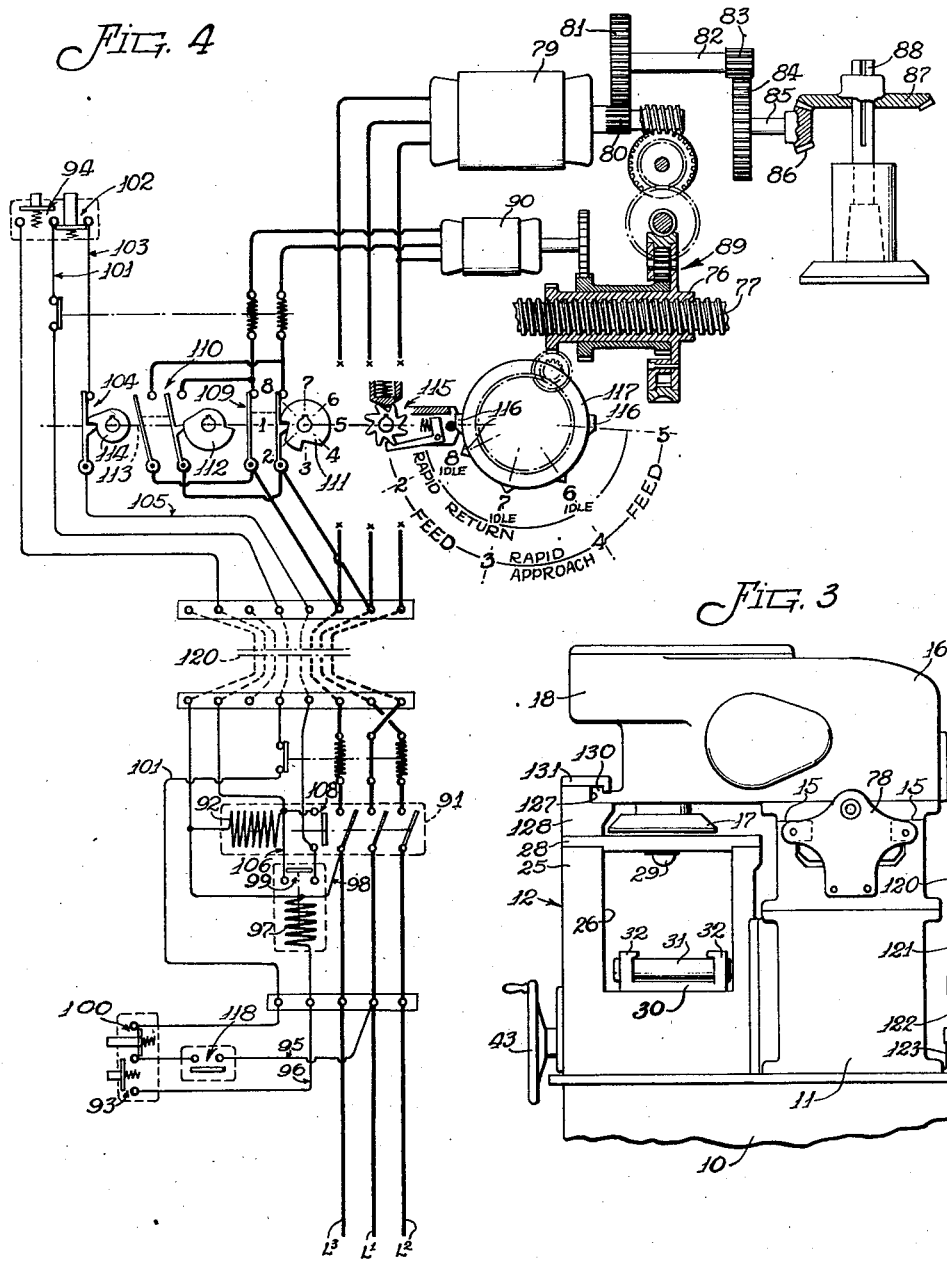

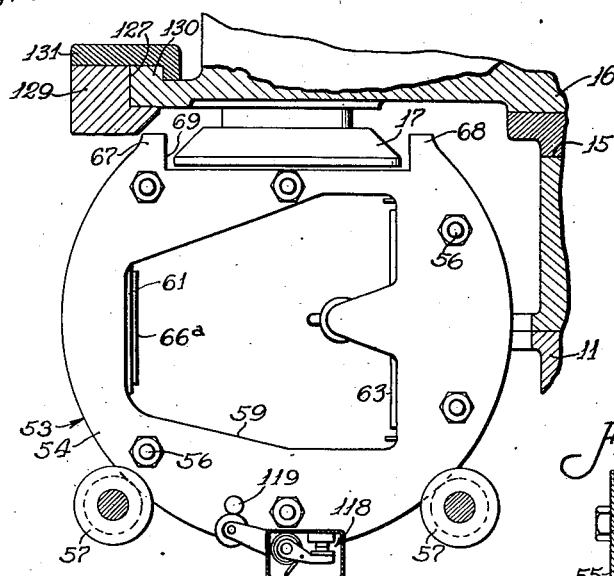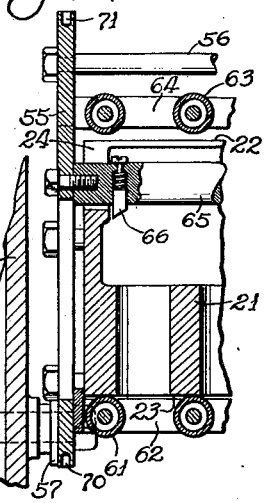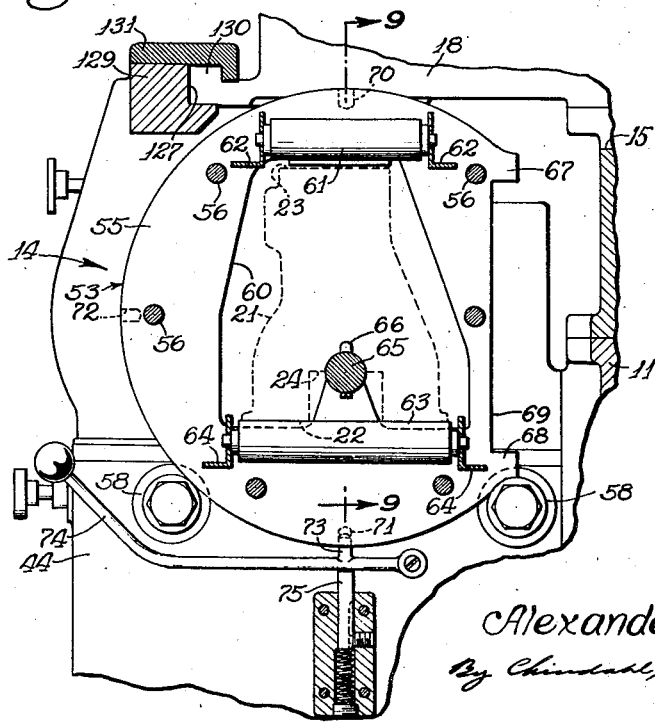

Patented Jan. 11, 1938

2,104,756

UNITED STATES PATENT OFFICE 2,104,756

METAL REMOVING MACHINE

Alexander Oberhoffken, Rockford, Ill., assignor to The Ingersoll Milling Machine Company, Rockford, Ill., a corporation of Illinois Application June 2, 1934, Serial No. 728,709

18 Claims. (Cl. 29—33)

The present invention relates to a new and improved metal removing machine.

One of the objects of the present invention resides in the provision of a novel machine in which a series of similar work pieces are advanced successively through a plurality of aligned work stations, and in which after each positioning of the work pieces a tool element is movable in a single unidirectional stroke or traverse to perform similar operations on different parts of the work pieces.

A further object is to provide a new and improved machine of the foregoing character in which the work pieces are advanced consecutively through the work stations in a direction opposite to that of the metal removing traverse of the tool element.

Still another object is to provide novel means located between adjacent work stations for facilitating the inversion and advance of each work piece where different faces or sides are to be operated on in successive operations.

A more specific object resides in the provision of the work inverting means in the form of a rotary barrel which is movable into one predetermined position to receive a work piece from one station, then into another position to permit the work piece to be advanced into another station, and finally into a third position to permit the traverse of the tool element, and which comprises means for locating and locking the barrel selectively in these positions.

A further object is to provide novel interlock means for preventing the tool element from being traversed until the barrel is located in the third or inoperative position.

Another object resides in the provision of a new and improved machine in which the tool element is carried by a tool head movable on elongated guideways along one side of the aligned work stations and in overhanging relation to the work pieces, and in which an auxiliary guide for the overhanging portion of the head is provided along the other side of the work stations.

A further object is to provide novel means for taking up slack in a flexible electric power inlet cable leading to the tool head for all positions of the latter along the aligned work stations.

Other objects and advantages will become apparent as the description proceeds.

In the accompanying drawings, Figure 1 is a fragmentary front elevational view of a machine embodying the features of my invention.

Fig. 2 is a fragmentary rear elevational view of one end of the machine.

Fig. 3 is a fragmentary right end view of the machine.

Fig. 4 is a diagrammatic view of the drive means for the cutting element and tool head and the electric wiring diagram therefor.

Fig. 5 is a fragmentary vertical sectional view through one of the work stations and taken along line 5—5 of Fig. 1.

Fig. 6 is a fragmentary vertical sectional view through another of the work stations and taken along line 6—6 of Fig. 1.

Fig. 7 is a fragmentary vertical sectional view of the inverting means between the work stations and taken along line 7—7 of Fig. 1.

Fig. 8 is a fragmentary vertical sectional view of the inverting means shown in Fig. 7 and taken along line 8—8 of Fig. 1.

Fig. 9 is a fragmentary detail view taken along line 9—9 of Fig. 8.

Referring more particularly to the drawings, the machine constituting the illustrative embodiment of the invention comprises an elongated horizontal machine frame having a base section 10 adapted to be mounted on the floor, and a superimposed guide section 11 on the rear portion of the base section. A plurality of work stations are located on the forward portion of the base section 10. In the present instance, there are shown two operating stations 12 and 13 and one intermediate transfer station 14.

The top of the guide section 11 is formed with parallel horizontal guideways 15 extending along the rear of the work stations 12, 13 and 14. Slidably mounted on the guideways 15 for power translation is a suitable tool head 16 carrying a tool element 17. The tool head 16 may be provided in any desired form adapted for the particular metal removing operation to be performed. Preferably, the tool head 16 has a laterally extending tool unit 18 in which the element 17 is supported in overhanging relation to the work stations.

It will be evident that the tool element 17 is adapted, in the traverse of the tool head 16 along the machine, to perform similar operations successively on work pieces positioned in the respective stations 12 and 13. Preferably, the tool head 16 is movable from the initial position, illustrated in Fig. 1, through a program cycle comprising a rapid approach to the station 13, a slow operating feed through this station, a rapid approach to the station 12, a slow operating feed through the last mentioned station, and an idle rapid return. After each cycle, the work pieces are advanced progressively one step along the work stations. Preferably, the work pieces are advanced in a direction opposite to that of the operative stroke of the tool head 16. Thus, the work piece in the station 13 is discharged from the machine onto a horizontal conveyor 19; the work piece in the station 12 is advanced into the station 13; and a new work piece from a horizontal conveyor 20 is positioned in the station 12. Instead of positioning work pieces only in the stations 12 and 13, it will be understood that each work piece after leaving the first station 12 may be retained in the transfer station 14 during the succeeding cycle, and then be advanced into the station 13.

It is possible by orientating the work pieces differently in the successive stations 12 and 13 to cause the tool element 17 to perform similar metal removing operations on different parts, surfaces or faces of the work pieces. The adjustment of the work pieces may be accomplished conveniently in the transfer station 14.

The invention, as embodied in the machine and method herein disclosed, although not limited to any particular kind of work or type of metal removing process, is especially adapted for successively milling the flat bottom and top surfaces or faces of internal combustion engine blocks 21. For this purpose, the tool element 17 is shown in the form of a depending end face milling cutter rotatable on a vertical axis. The typical form of engine block 21, selected for purposes of illustration, has flat parallel bottom and top faces 22 and 23. The bottom face 22 is interrupted by similar recesses 24 in the end walls of the block.

The first station 12 is defined by a work fixture (see Figs. 1, 3, and 5) which comprises a hollow frame 25 rigidly mounted on the base section 10 adjacent the right end and against the front wall of the guide section 11. The right and left end walls of the frame 25 are formed respectively with openings 26 and 27 for the endwise insertion and discharge of the engine blocks 21. The top of the frame 25 is also open, and is provided with an apertured plate 28 through which the face 22 normally constituting the bottom of the engine block 21 is presented to the cutting tool 17. Rigidly spanning the opening in the plate 28 is a cross bar 29 adapted to interfit accurately with the recesses 24 so as to locate the engine block 21 laterally and vertically in the desired relationship to the cutting tool 17.

A work support or platform 30 is mounted for vertical adjustment within the frame 25. After each cutting operation, the support 30 is adapted to be lowered to release the surfaced block 21 and permit its removal to the transfer station 14, and then to receive another block from the conveyor 20. The support 30 now is adapted to be elevated to clamp the last block in position against the locating bar 29. In its preferred form, the support 30 comprises a plurality of transverse rollers 31 which are journaled in parallel horizontal guide bars 32. The rollers 31 and bars 32 constitute a conveyor for approximately locating the block 21 and for facilitating its passage through the fixture. Rigidly secured to the underside of the support 30 is a vertical non-rotatable adjusting screw 33 in threaded engagement with an elongated nut 34. The latter extends through and bears rotatably in a bore 35 formed in a bearing bracket 36 integral with the frame 25. The upper end of the bore 35 is counterbored to receive a vertical thrust bearing 37. A peripheral flange 38 on the nut 34 seats on the bearing 37. The lower end of the nut 34 is connected through bevel gears 39 and 40 to a transverse shaft 41 which is journaled in and extends through an elongated bearing 42 in the front wall of the frame 25, and which is provided on its outer end with a hand wheel 43.

The second operating station 13 is defined by a work fixture (see Figs. 1 and 6) comprising a hollow frame 44 rigidly mounted on the base section 10 and against the front wall of the guide section 11. The frame 44 is open at the top, and has an upstanding rear wall 45. An apertured plate 46 is positioned across the top of the frame 44, and supports two parallel longitudinal guide rails 47 adapted to receive the engine block 21 from the transfer station 14. Rigidly mounted on the front portion of the plate 46 is a vertical front wall 48 extending parallel to the wall 45. In this fixture, the block 21 is supported in upright position with the upper face 23 presented to the cutting tool 17. Suitable longitudinal guide bars 49 on the inner sides of the walls 45 and 48 serve to locate the block 21 approximately in position. The block 21 is held against a locating abutment 50 on the rear wall 45 by a clamp screw 51 and against the rails 47 by an inclined clamp screw 52. Both of the screws 51 and 52 are threaded through the front wall 48.

The transfer station 14 comprises suitable means for receiving the blocks 21 singly from the station 12, inverting them through 180 degrees, and facilitating their removal to the station 13. In the present instance, this means (see Figs. 7 to 9) comprises a rotatable barrel 53 mounted on a horizontal axis in alignment with the stations 12 and 13. The barrel 53 is constructed of two circular end plates 54 and 55 rigidly connected in spaced relation by a plurality of longitudinal draw bolts 56, and mounted at spaced points at their lower edges on two sets of flanged rollers 57 and 58 journaled respectively on the adjacent end walls of the frames 25 and 44.

The end plates 54 and 55 are formed with centrally located aligned openings 59 and 60 corresponding generally in size and shape to the ends of the blocks 21. Extending longitudinally through the barrel 53 between the openings 59 and 60 are two parallel guide conveyors between which the blocks 21 are adapted to be positioned. One conveyor comprises a series of rollers 61 journaled in angle bars 62, and adapted for engagement with the relatively narrow faces 23 of the blocks 21. The other conveyor comprises a like series of rollers 63 journaled in angle bars 64 and adapted to support the relatively wide faces 22 of the blocks 21. The angle bars 62 and 64 are anchored at their ends against the end plates 59 and 60, and serve to increase the rigidity of the barrel 53.

A locating bar 65, adapted to fit into the recesses 24 of the blocks 21, extends along the conveyor 63, and is attached at opposite ends to the plates 54 and 55. It will be evident that the blocks 21 in their movement through the station 14 are slidable along the bar 65, and are thereby held against lateral displacement. A spring detent 66 is mounted in the bar 65, and projects laterally therefrom for engagement with the inside of the leading end wall of each block 21 as the latter is advanced into position within the barrel 53, and serves to prevent the block from being returned to the station 12. The projecting end of the detent 66 is beveled for snap over engagement by the end walls of the blocks 21, and hence permits the latter to be transferred from the barrel 53 into station 13.

The barrel 53 has three angular positions of adjustment. The first position is determined by engagement of two lugs 67 on the end plates 54 and 55 with the outer rollers 57 and 58. In this position (see Fig. 9), the guideway 61 is aligned with the lowered work support 30 to receive the blocks 21 singly from the station 12. A fixed abutment 66ᵃ limits the inward movement of the block. The second position is similarly determined by engagement of two lugs 68 on the end plates 54 and 55 with the inner rollers 57 and 58 upon angular adjustment of the barrel 53 through 180 degrees. In this position (see Fig. 8), the block 21 clears the abutment 66a, and the guideway 63 is aligned with the guide rails 47 for removal of the block to the station 13. The third position (see Fig. 7), is intermediate the first and second positions, and is adapted to be occupied by the barrel 53 during the machine operation. In this position, the lugs 67 and 68 are disposed upwardly. The end plates 54 and 55 are formed with recesses 69 between the lugs 67 and 68 to provide clearance for the passage of the cutting tool 17 in its movement along the machine.

Formed in the periphery of the end plate 55 are three radial recesses or bores 70, 71, and 72, spaced 90 degrees apart and adapted for engagement by a detent 73 to lock the barrel 53 selectively in either of its three positions of adjustment. The detent 73 is carried by a hand lever 74 projecting to the front of the machine, and pivoted at its rear end on the frame 44. A spring pressed plunger 75 acts against the underside of the lever 74, and tends to urge the detent 73 against the periphery of the end plate 55.

The tool head 16 may be provided in any suitable form adapted for the particular metal removing operation to be performed, and preferably is a self-contained unit embodying power means for driving the cutting tool 17 and translating it through a predetermined program of rapid traverse and feed movements along the guide section 11, as disclosed in Patent No. 2,040,872. The translatory drive (see Fig. 4) comprises an elongated nut 76 mounted for rotation in the underside of the tool head 16, and threaded on a fixed screw 77 extending longitudinally of the guide section 11. The opposite ends of the screw 77 are anchored in mounting brackets 78 on the ends of the section 11.

Rotation is imparted to the cutting tool 17 by an electric feed motor 79 in the head 16. The drive extends from the motor 79 through gears 80 and 81, a shaft 82, gears 83 and 84, a shaft 85 and gears 86 and 87 to a vertical spindle 88 on which the tool 17 is mounted.

The nut 76 is adapted to be driven through a differential mechanism 89 either by the feed motor 79 for the feed movements or by the feed motor and a reversible electric rapid traverse motor 90 for the rapid traverse movements. By reversing the rotation of the motor 90, the rapid traverse movement of the tool head 16 may be reversed.

Electric power for the motors 79 and 90 is available from three supply mains $L_1$, $L_2$, and $L_3$ under the control of a switch 91 adapted to be closed upon excitation of a coil 92. All of the mains lead directly to the motor 79 so that the latter will operate continuously when the switch 91 is closed. To close the switch 91, either of two manual starting switches 93 and 94 is closed momentarily. Assuming that the switch 93 is closed, the following circuit will be established: from the main $L_1$, through a line 95, the switch 93, a line 96, a coil 97, and a line 98 to the main $L_3$. Excitation of the coil 97 will close a switch 99 to establish the following circuit: from the main $L_1$, through the line 95, a normally closed manual stop switch 100, a line 101, a second normally closed manual stop switch 102, a line 103, a normally closed automatic stop switch 104, a line 105, the switch 99, a line 106, the coil 92, and the line 98 to the main $L_3$.

If the switch 94 is closed instead of the switch 93, the following equivalent circuit will be established; from the main $L_1$, through the line 95, the switch 100, the line 101, the switch 94, a line 107, the coil 92 and the line 98 to the main $L_3$.

Excitation of the coil 92 serves to close the main switch 91 and a holding switch 108 which shunts the switches 94 and 99 and maintains the exciting circuit through the stop switches 100, 102 and 104. The switches 93 and 100 are mounted on the base section 10, and the switches 94 and 102 are located on the tool head 16. They afford selectively available manual means for starting and stopping the operation of the machine.

The main $L_1$ leads directly to the motor 90, but the connection of the mains $L_2$ and $L_3$ thereto is controlled automatically by two sets of switches 109 and 110 operable selectively to start, reverse or stop the motor. Operation of the switches 109 and 110 is under the control respectively of two rotary cams 111 and 112 which are mounted on a cam shaft 113 adapted to be indexed step-by-step through a plurality of positions over one complete revolution during each complete cycle of the tool head 16. A third cam 114 on the shaft 113 is operable to open the stop switch 104 at the end of the cycle.

In the present instance, the tool head 16 is movable through a program consisting of a rapid traverse, a feed, a rapid traverse and a feed in one direction, and a rapid traverse in the opposite direction. Hence, the cam shaft 113 has eight uniformly spaced positions. In the initial position, illustrated in Fig. 4, the switches 109 are closed and the switches 110 are open to effect operation of the motor 90. The switches 110 are held open during rotation of the shaft 113 through the first four positions. In the second position, the switches 109 are opened to stop the motor 90 and institute the first feed movement. The switches 109 again are closed in the third position to reestablish the rapid traverse. In the fourth position, the switches 109 are opened to institute the second feed movement. They now remain open until the end of the cycle. In the fifth position, the switches 110 are closed to institute the rapid traverse in the reverse direction. They remain closed through the remaining positions. At the end of the cycle, the cam 114 opens the switch 104 to stop the tool head 16, and the parts assume their initial positions.

The cam shaft 113 is indexed in predetermined relation to the movements of the tool head 16 by a ratchet mechanism 115 operable periodically by a series of adjustable cam lugs 116 on a rotary disk 117 driven from the sleeve 76. It will be evident that the lugs 116 may be relatively adjusted to vary the duration of the traverse and feed movements in accordance with the requirements of the work pieces.

An interlock is provided to prevent operation of the tool head 16 unless the barrel 53 is in its idle position as shown in Fig. 7. Preferably, the interlock comprises a normally open switch 118 which is adapted to be closed by engagement with an abutment 119 on the end plate 54. The switch 118 is interposed in the line 95, and therefore controls the circuits for energizing the coil 92.

The various electric lines leading from the main switch 91 to the tool head 16 are united in a single insulated cable 120. Since the cable is made of substantial length to accommodate the long range of movement of the tool head, means is provided for taking up the slack in the cable at all times. This means (see Fig. 2) comprises a sheave 121 over which the intermediate portion of the cable 120 is directed and which is rotatable in a carriage 122 movable along a guide rail 123 at the rear of the base section 10. One end of the cable 120 is connected to the tool head 16 and the other end is connected to the base section 10 at approximately the midpoint of the range of movement. To urge the sheave 121 yieldably against the electric cable 120, a flexible rope or cable 124 is connected at one end to the carriage 122 and is wound at the other end about a rotatable drum 125 mounted on the left end of the base section 10. A torsion spring 126 tends to rotate the drum 125 in a direction to wind up the cable 124.

The tool unit 18 overhangs the forward portion of the base section 10 to position the cutting tool 17 for successive engagement with the work pieces in the aligned stations. Preferably, auxiliary means is provided for supporting and guiding the forward end of the tool unit 18. This means (see Figs. 1 and 5 to 8) comprises a guideway 127 parallel to the guideways 15 and located at the front of the work stations. The guideway 127 consists of a series of aligned sections formed respectively in a block 128 mounted on the forward edge of the plate 28, in a bridge member 129 extending between the stations 12 and 13, and in the top of the wall 48. The forward end of the tool unit 18 is formed with a guide 130 slidable in the guideway 127. A gib plate 131 is mounted on the block 128, the bridge member 129 and the wall 48 and overlies the guide 130 to confine the latter in the guideway 127.

The operation will be evident from the foregoing description, and briefly summarized is as follows: A series of engine blocks 21 are advanced progressively through the stations 12 and 13. As each block 21 is transferred from the station 12 to the station 13, it is inverted so that different surfaces thereof are presented to the cutting tool 17 in successive operations. At the end of each cycle of operations, the finished block in the station 13 is discharged onto the conveyor 19; the partially finished block in the station 12 is inverted and then positioned in the station 13; and a new block from the conveyor 20 is positioned in the station 12. If desired, each block as it leaves the station 12 may be retained in the transfer station 14 during the succeeding cycle and then advanced into the station 13. The cutting tool 17 in each operative stroke in one direction acts successively to perform similar operations on different surfaces of the work pieces.

I claim as my invention:

1. A machine tool comprising, in combination, an elongated base, a plurality of work fixtures mounted in spaced relation along said base and adapted to support a series of like work pieces respectively in different angular positions, a tool head mounted on said base for movement in a unidirectional cutting stroke successively into operative relation with said fixtures to perform similar metal removing operations on different surfaces of said work pieces, and drive means for reciprocating said tool head first in said cutting stroke through a series of rapid approach and feed movements for each fixture and then in a continuous rapid traverse return stroke.

2. A machine tool comprising, in combination, an elongated base, a plurality of work fixtures mounted in spaced relation along said base and adapted to support a series of like work pieces respectively in different angular positions, a tool head mounted on said base for movement in a unidirectional cutting stroke successively into operative relation with said fixtures to perform similar metal removing operations on different surfaces of said work pieces, drive means for reciprocating said tool head, means by which the work pieces may be advanced progressively through said fixtures in a direction opposite said cutting stroke, and means for adjusting the angular position of each work piece in its passage from any one fixture to the next fixture.

3. A machine tool comprising, in combination, an elongated horizontal base having longitudinal guideways, two work fixtures mounted on said base in spaced relation along said guideways and adapted to support two of a series of work pieces movable progressively therethrough, means for receiving a work piece from one fixture, inverting the work piece through 180 degrees and then permitting removal of the work piece into the other fixture, a tool unit mounted on said base for reciprocation in a continuous stroke along said guideways to act successively on the work pieces in the respective fixtures, and power drive means for said tool unit.

4. A machine tool comprising, in combination, an elongated base, two work fixtures mounted in spaced relation along said base and adapted to support two of a series of work pieces movable progressively therethrough, means adjustable into one position to receive a work piece from one fixture, then through 180 degrees to invert the work piece and permit removal thereof into the other fixture, and then into an inoperative position, a tool unit mounted on said base for reciprocation in a unidirectional stroke along said base to act successively on the work pieces in the respective fixtures, power drive means for said tool unit, and interlock means for preventing the operation of said last mentioned means unless said first mentioned means is in said inoperative position.

5. A machine tool having, in combination, an elongated base, a tool head having self-contained electric drive means and mounted for reciprocation on said base, an electric cable connected at one end to said tool head and being of sufficient length to accommodate the movement of said tool head on said base, a sheave mounted for movement along said base and engaging an intermediate portion of said table, a rotatable spring reel mounted in fixed relation to said base, and a flexible member tending to wind onto said reel and operatively connected to said sheave to cause the latter to fold and hold said cable taut in all positions of said tool head.

6. A machine tool comprising, in combination, an elongated base having longitudinal guideways, a plurality of work fixtures mounted in spaced relation along said base, a tool unit mounted on said guideways at one side of said fixtures for reciprocation successively into operative relation with said fixtures and having a portion in overhanging relation to said fixtures, auxiliary means for slidably supporting and guiding said overhanging portion at the opposite side of said fixtures, and means for driving said tool unit.

7. In a machine tool, a work fixture comprising, in combination, a hollow frame, a guide conveyor leading to one end of said frame, a second guide conveyor leading from the other end of said frame, a work support mounted for vertical adjustment in said frame and defining a longitudinal guide conveyor, work locating means overlying said support, and means for adjusting said support vertically to clamp the work against said locating means or to release the work and lower said last mentioned conveyor into alignment with said first mentioned conveyors.

8. In a machine tool, a work fixture comprising, in combination, a hollow frame having an inlet opening at one side and an outlet opening at the other side, a work support mounted for vertical adjustment in said frame and defining a guide conveyor extending between said openings, work locating means overlying said support, and means for adjusting said support vertically to clamp the work against said locating means or to release the work.

9. In a machine tool, a work fixture comprising, in combination, a hollow frame adapted to receive a work piece through one end and to discharge the work piece from the other end, spaced guide rails in said frame to support the work, means for locating the work laterally of said rails, and means for clamping the work in position against said rails and said locating means.

10. In a machine tool, a work fixture comprising a rotatable barrel having generally circular end plates and means for securing said plates in spaced relation, guide rollers for supporting said end plates for rotary adjustment, means for locating said barrel selectively in any one of three different angular positions spaced 90 degrees apart, two parallel opposed guideways extending longitudinally through said barrel and adapted selectively to support the work upon angular adjustment of said barrel into one or the other of its extreme positions, and means for locking said barrel releasably in any one of said positions of adjustment.

11. In a machine tool, a work fixture comprising, in combination, a rotatable frame open at one end to receive the work blank and at the other end to discharge the blank, two parallel supports extending longitudinally through said frame and adapted respectively to support the work piece upon adjustment of said frame into different angular positions, and means for locating said frame selectively in any one of said positions of adjustment.

12. A machine tool organization having, in combination, two fixtures arranged in spaced relation to support similar work pieces, a conveyor by which a work piece may be advanced from one of said fixtures to the other, means providing elongated guideways extending along said conveyor, a head movable along said guideways, a tool arranged on said head for operative association with the work pieces in said fixtures, and power driven means for moving said head along said guideways to present said tool to said work pieces successively in a continuous unidirectional stroke of the head.

13. A machine tool organization having, in combination, two fixtures arranged in spaced relation to support similar work pieces in different positions, a conveyor by which a work piece may be advanced from one of said fixtures to the other, means providing an elongated slideway alongside said conveyor, a head movable along said slideway, a tool arranged on said head for operative association with the work pieces in said fixtures, and power driven means for advancing said head in a continuous unidirectional stroke at cutting rates during engagement of said tool and said work pieces and at rapid traverse rates in passing from one work piece to the other.

14. A machine tool organization having, in combination, two fixtures arranged in spaced relation and adapted to support similar work pieces with surfaces thereof to be machined facing upwardly, an elongated slideway extending transversely of both of said fixtures, a tool head movable along said slideway and having a tool thereon arranged for operative association with the work pieces in said fixtures to machine the upper surfaces thereof, power driven means for moving said head in a continuous unidirectional stroke and at cutting speeds during engagement of the tool with the work pieces in said fixtures, at rapid traverse speed in passing from one work piece to the next, and in a continuous stroke at rapid traverse speed in returning the head past both of said fixtures.

15. A machine tool organization comprising, in combination, an elongated base providing a longitudinal guideway, a work fixture mounted at one side of said base, a tool unit guided by said guideway at one side of said fixture and having an extension projecting laterally so as to overly a work piece in said fixture, a rotary cutting tool mounted in said extension for operative association with the work piece in said fixture, power driven means for rotating the tool in advancing said unit along said guideway, and auxiliary means spaced laterally from said guideway and slidably supporting and guiding the overhanging portion of said extension.

16. A machine tool organization comprising, in combination, two fixtures for supporting similar pieces of work in spaced relation, a conveyor by which work pieces may be advanced successively through said fixtures in one direction, a tool head carrying a rotary cutting tool, means slidably supporting said head for movement along said fixtures to bring said tool into cutting engagement successively with work pieces supported in said fixtures, and power driven means for advancing said head in a continuous unidirectional stroke at cutting speeds past said fixtures in a direction opposite to that in which said work pieces are conveyed through said fixtures.

17. A machine tool organization having, in combination, two fixtures arranged in spaced relation and adapted to support similar work pieces with different side surfaces thereof disposed in a common cutting line, conveyor means by which said work pieces may be moved successively through said fixtures, an elongated slideway extending along said fixtures, a tool head movable along said slideway and having a rotary cutting tool thereon arranged to perform a metal removing operation in said cutting line on the work pieces in said fixtures, and power driven means for moving said head in a continuous unidirectional stroke into operative engagement successively with the work pieces in said fixtures.

18. A machine tool organization comprising, in combination, means providing an elongated slideway, a tool head guided in said slideway and having a rotary cutting tool mounted thereon, a work fixture mounted at one side of said slideway for supporting a work piece to be operated upon by said tool, a second slideway disposed parallel to said first mentioned slideway on the side of said fixture opposite the first mentioned slideway, and means on said tool head engaging said second slideway during operative engagement of said tool and a work piece in said fixture whereby to support the overhanging portion of said head during such engagement.

ALEXANDER OBERHOFFKEN.